(12) United States Patent
Renggli (10) Patent No.: US 7,963,099 B2
(45) Date of Patent: Jun. 21, 2011

(54) FLUTED CHEVRON EXHAUST NOZZLE (75) Inventor: Bernard James Renggli, Cincinnatti, OH (US)

(73) Assignee: General Electric Company, Schenectady, NY (US)

(*) Notice: Subject to any disclaimer, the term of this patent is extended or adjusted under 35 U.S.C. 154(b) by 1293 days.

(21) Appl. No.: 11/751,174

(22) Filed: May 21, 2007

(65) Prior Publication Data
US 2009/0071164 A1    Mar. 19, 2009

(51) Int. Cl.
F02K 1/38    (2006.01)
(52) U.S. Cl. ............................................. 60/262; 60/770
(58) Field of Classification Search .................. 60/770, 60/771, 262; 239/265.11, 265.19, 265.39
See application file for complete search history.

(56) References Cited

U.S. PATENT DOCUMENTS

| | | | |
|---|---|---|---|
| 2,636,780 A * | 4/1953 | Barnes | 239/417 |
| 2,997,845 A * | 8/1961 | Oulianoff | 239/265.17 |
| 3,084,507 A | 4/1963 | Kleinhans et al. | |
| 3,092,205 A | 6/1963 | Brown et al. | |
| 3,153,319 A | 10/1964 | Young et al. | |
| 3,568,792 A | 3/1971 | Urquhart | |
| 3,721,314 A * | 3/1973 | Hoch et al. | 181/215 |
| 4,401,269 A | 8/1983 | Eiler | |
| 4,501,393 A | 2/1985 | Klees et al. | |
| 4,543,784 A | 10/1985 | Kirker | |
| 4,592,201 A | 6/1986 | Dusa et al. | |
| 4,754,924 A | 7/1988 | Shannon | |
| 4,830,315 A | 5/1989 | Presz et al. | |
| 4,872,612 A * | 10/1989 | Singer | 239/265.19 |
| 5,402,963 A | 4/1995 | Carey et al. | |
| 5,908,159 A | 6/1999 | Rudolph | |
| 6,314,721 B1 | 11/2001 | Mathews et al. | |
| 6,360,528 B1 | 3/2002 | Brausch et al. | |
| 6,487,848 B2 | 12/2002 | Zysman et al. | |
| 6,532,729 B2 * | 3/2003 | Martens | 60/204 |
| 6,612,106 B2 | 9/2003 | Balzer | |
| 6,658,839 B2 | 12/2003 | Hebert | |
| 6,718,752 B2 | 4/2004 | Nesbitt et al. | |
| 6,786,037 B2 | 9/2004 | Balzer | |
| 6,786,038 B2 * | 9/2004 | Lair | 60/226.1 |
| 6,826,901 B2 | 12/2004 | Hebert | |
| 6,935,098 B2 | 8/2005 | Bardagi et al. | |
| 7,000,378 B2 | 2/2006 | Birch et al. | |
| 7,040,553 B2 * | 5/2006 | Clark | 239/263.3 |
| 7,065,957 B2 | 6/2006 | Balzer | |
| 7,093,423 B2 | 8/2006 | Gowda et al. | |
| 7,174,704 B2 | 2/2007 | Renggli | |
| 7,174,718 B2 | 2/2007 | Bonnet et al. | |
| 7,216,831 B2 | 5/2007 | Wood | |
| 7,340,883 B2 | 3/2008 | Wood et al. | |
| 7,520,124 B2 * | 4/2009 | Narayanan et al. | 60/262 |
| 7,578,132 B2 | 8/2009 | Webster | |
| 7,644,575 B2 | 1/2010 | Wood et al. | |

(Continued)

FOREIGN PATENT DOCUMENTS

EP    1703114 A1    9/2006

(Continued)

Primary Examiner — Michael Cuff
Assistant Examiner — Phutthiwat Wongwian
(74) Attorney, Agent, or Firm — William S. Andes; Francis L. Conte (57) ABSTRACT A gas turbine engine exhaust nozzle includes a fluted shell terminating in a row of chevrons. The nozzle is radially serpentine circumferentially around the shell and has a circumferentially serpentine trailing edge.

29 Claims, 6 Drawing Sheets

U.S. PATENT DOCUMENTS

| | | |
|---|---|---|
| 7,721,551 B2 * | 5/2010 | Hanson .................. 60/771 |
| 7,739,872 B2 | 6/2010 | Murphy et al. |
| 2002/0125340 A1 | 9/2002 | Birch et al. |
| 2003/0221411 A1 | 12/2003 | Nesbitt et al. |
| 2005/0081509 A1 | 4/2005 | Johnson |
| 2005/0172611 A1 | 8/2005 | Blodgett et al. |
| 2005/0193716 A1 | 9/2005 | Schlinker et al. |
| 2005/0214107 A1 | 9/2005 | Gutmark et al. |
| 2005/0229585 A1 | 10/2005 | Webster |
| 2006/0053769 A1 * | 3/2006 | Feuillard et al. ........ 60/226.1 |
| 2006/0101803 A1 * | 5/2006 | White .................... 60/204 |
| 2006/0101807 A1 | 5/2006 | Wood et al. |
| 2006/0213198 A1 * | 9/2006 | Arbona et al. .......... 60/771 |
| 2007/0033922 A1 * | 2/2007 | Reba et al. ............. 60/262 |
| 2007/0234728 A1 * | 10/2007 | Peters ................... 60/771 |
| 2007/0235080 A1 * | 10/2007 | Hocking ................ 137/85 |
| 2008/0120979 A1 | 5/2008 | Wood et al. |
| 2008/0202847 A1 | 8/2008 | Porte |
| 2009/0064660 A1 * | 3/2009 | Toffan et al. ........... 60/232 |
| 2009/0178410 A1 | 7/2009 | Straza |
| 2009/0320487 A1 | 12/2009 | Alkislar et al. |
| 2010/0011777 A1 | 1/2010 | Wood et al. |
| 2010/0018212 A1 | 1/2010 | Core |

FOREIGN PATENT DOCUMENTS

| | | |
|---|---|---|
| EP | 1752649 A2 | 2/2007 |
| GB | 2146702 A | 4/1985 |
| GB | 2289921 A | 12/1995 |
| WO | WO2006/055217 A1 | 5/2006 |

* cited by examiner

FLUTED CHEVRON EXHAUST NOZZLE

The U.S. Government may have certain rights in this invention pursuant to contract number MDA972-01-3-0002 awarded by DARPA.

BACKGROUND OF THE INVENTION

The present invention relates generally to gas turbine engines, and, more specifically, to exhaust nozzles therein.

In a gas turbine engine, air is pressurized in a compressor and mixed with fuel in a combustor for generating hot combustion gases. Energy is extracted from the gases in a high pressure turbine (HPT) for powering the compressor, and further energy is extracted in a low pressure turbine (LPT) which powers a fan in a turbofan aircraft engine configuration.

In a turbofan engine, a substantial portion of the air pressurized by the fan is used for providing propulsion thrust for powering an aircraft in flight. A portion of the fan air is further pressurized in the compressor for generating the combustion gases which are also discharged from the engine to provide additional thrust.

The engine may include two separate exhaust nozzles, one for the fan air and one for core exhaust, which both discharge their exhaust flows together into the ambient external airstream for propelling the aircraft during flight.

The high velocity engine exhaust flow mixes with the ambient airflow and generates considerable noise during aircraft takeoff and climb from an airport. Government regulations limit noise levels, and are a significant design objective especially for more powerful aircraft engines.

Various noise attenuation features have been developed over the history of modern aircraft engines but typically add weight and cost to the engine, and can adversely affect overall engine performance and efficiency of operation.

A modern noise attenuation exhaust nozzle is disclosed is U.S. Pat. No. 6,360,528 assigned to the present assignee. The chevron nozzle in this patent has a serpentine triangular trailing edge and separates internal and external flowstreams. The chevron nozzle is a relatively thin, single-ply sheet metal shell which permits the relatively slow velocity external flow to mix with the higher velocity internal core flow for substantially reducing the velocity thereof, and correspondingly reducing noise.

The chevron nozzle is being developed specifically for reducing noise in subsonic commercial aircraft engines which require maximum efficiency of operation, yet such noise reduction does not significantly compromise engine efficiency due to the simple and lightweight chevron nozzle.

However, supersonic business jet (SSBJ) engines are presently being developed for achieving supersonic cruise operation of commercial aircraft. Supersonic operation of the aircraft requires considerably more powerful aircraft engines, and increases the difficulty of noise attenuation.

Since the SSBJ engine must operate both subsonically and supersonically, the engine must be operated with a variable cycle for maximizing efficiency across the large speed range. A convergent-divergent (CD) exhaust nozzle, which is typically variable, is typically used for supersonic engines with and without afterburners or combustion augmenters.

Subsonic commercial aircraft typically have turbofan engines with converging exhaust nozzles operating up to about a nozzle pressure ratio of 4. Supersonic turbofan engines are typically designed with higher nozzle pressure ratios exceeding 4, and utilize the CD nozzle for optimizing performance.

The CD nozzle is inherently more complex than the simpler converging subsonic nozzle, and has a greater need for noise attenuation due to the increased velocity of the exhaust flow.

Accordingly, it is desired to provide an improved exhaust nozzle for attenuating noise in the differently configured exhaust nozzle of a supersonic aircraft engine.

BRIEF DESCRIPTION OF THE INVENTION

A gas turbine engine exhaust nozzle includes a fluted shell terminating in a row of chevrons. The nozzle is radially serpentine circumferentially around the shell and has a circumferentially serpentine trailing edge.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
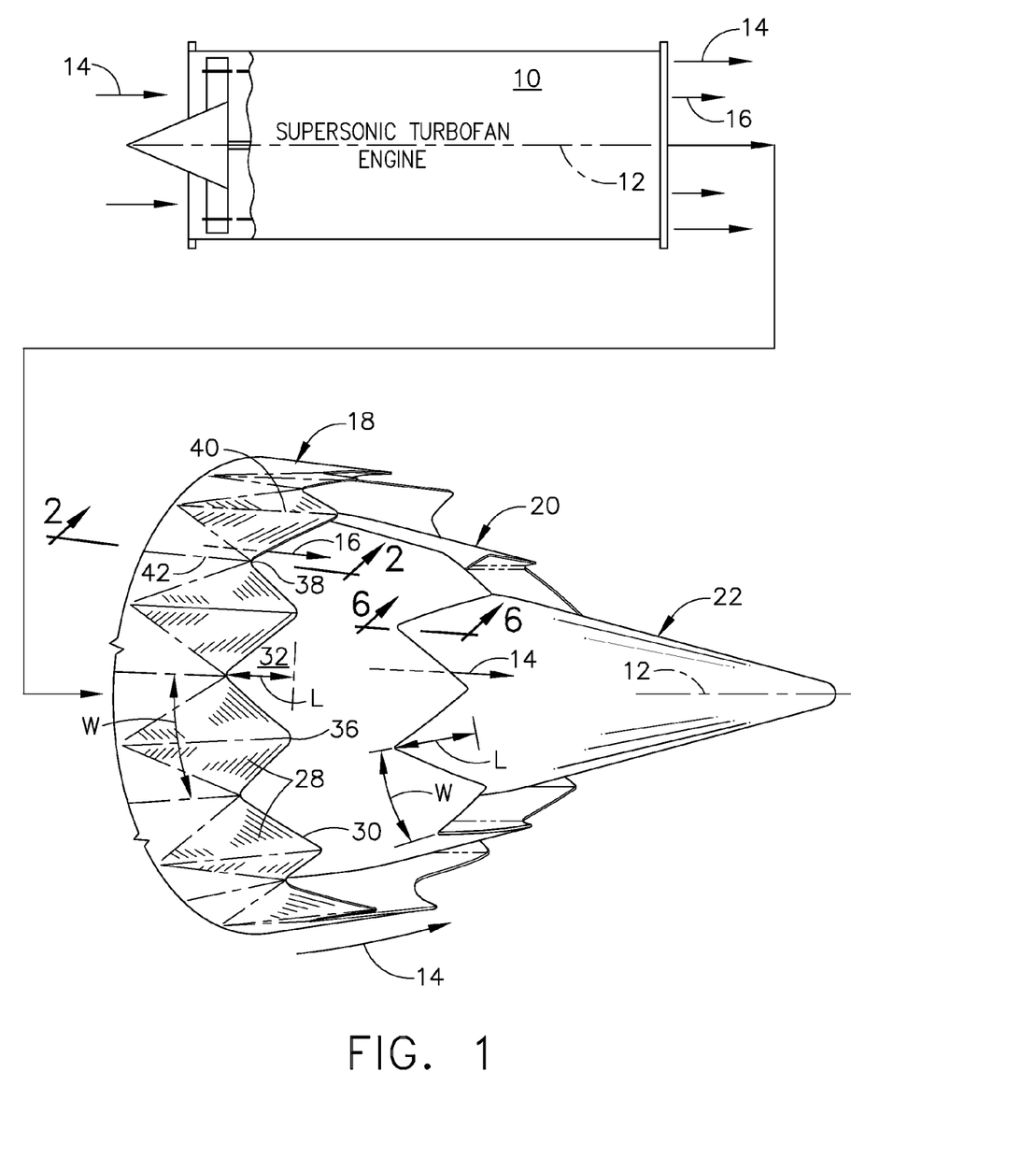
FIG. 1 is a isometric view of an exemplary exhaust nozzle for a supersonic turbofan aircraft engine.

Illustrated schematically in FIG. 1 is an exemplary turbofan gas turbine aircraft engine 10 configured for powering an aircraft (not shown) in flight to supersonic flight speeds. The engine is axisymmetric about a longitudinal or axial centerline axis 12.

The engine 10 may have any conventional configuration including a multistage axial compressor for pressurizing air 14 which is mixed with fuel and ignited in a combustor for generating hot combustion gases 16. An HPT extracts energy from the combustion gases to power the compressor, and a LPT extracts energy from the combustion gases to power an upstream fan.

The engine has various internal and external casings which define internal flow passages and bypass ducts for separately channeling the pressurized air and core gases therethrough. The engine may also include a fan-on-blade (FLADE) configuration which pressurizes the air in two separate annular flowpaths from a common row of fan blades. The pressurized air and core gases are typically discharged from the aft end of the engine in concentric streams either inverted or not depending upon the specific design of the engine.

As indicated above, the exhaust flows 14,16 from the engine 10 create noise when discharged into the atmosphere during aircraft propulsion. Accordingly, the engine includes at its aft end outer and inner annular acoustic exhaust nozzles 18,20 surrounding a centerbody or plug 22 coaxially around the common centerline axis 12.

In the exemplary inverted flow configuration illustrated in FIG. 1, the core combustion gases 16 are discharged through the outer nozzle 18, while the pressurized fan air 14 is discharged through the inner nozzle 20. In non-inverted flow, the fan air would be discharged through the outer nozzle 18, and the core gases 16 discharged through the inner nozzle 20. And, the freestream airflow 14 flows outside the nozzles as the engine propels the aircraft during flight operation.

The two nozzles 18,20 initially illustrated in FIG. 1 are specifically configured for improving mixing between the internal and external flowstreams for reducing maximum flow velocity and thereby attenuating or reducing noise during operation. The outer acoustic nozzle 18 is illustrated in a first exemplary embodiment in FIG. 2-4.

The exhaust nozzle 18 includes concentric outer and inner shells or annular walls 24,26 extending coaxially about the common centerline axis 12 illustrated in FIG. 1 between forward and aft ends thereof. The forward end of the nozzle is suitably mounted to an aft frame in the engine in a conventional manner.

Figure 2:
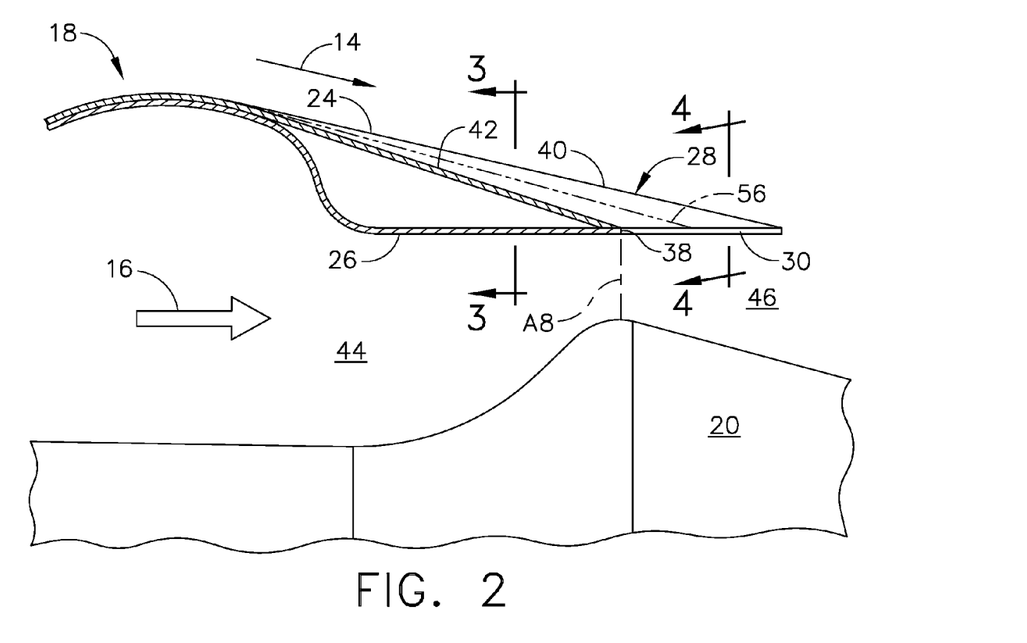
FIG. 2 is an axial sectional view of a portion of the outer exhaust nozzle illustrated in FIG. 1 in accordance with one embodiment.
Figure 3:
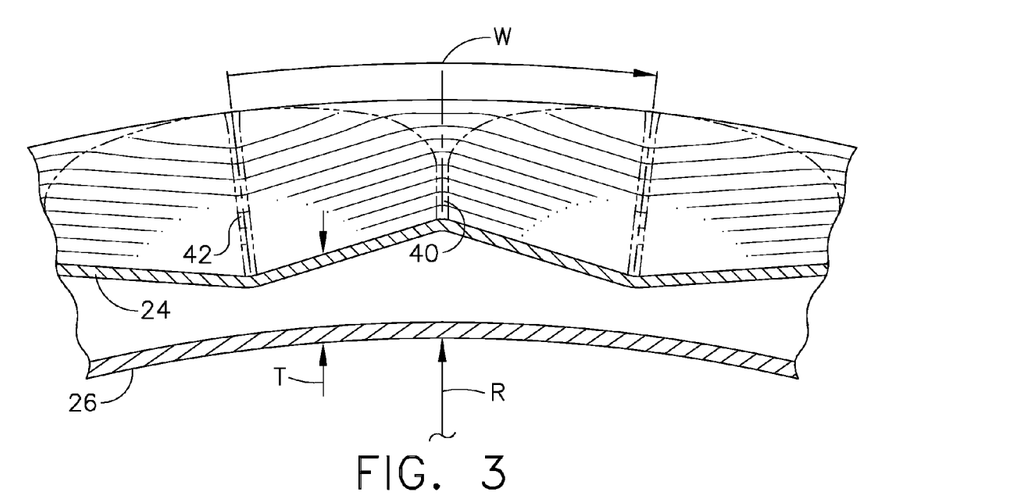
FIG. 3 is a radial sectional view through a portion of the exhaust nozzle illustrated in FIG. 2 and taken along line 3-3.
Figure 4:
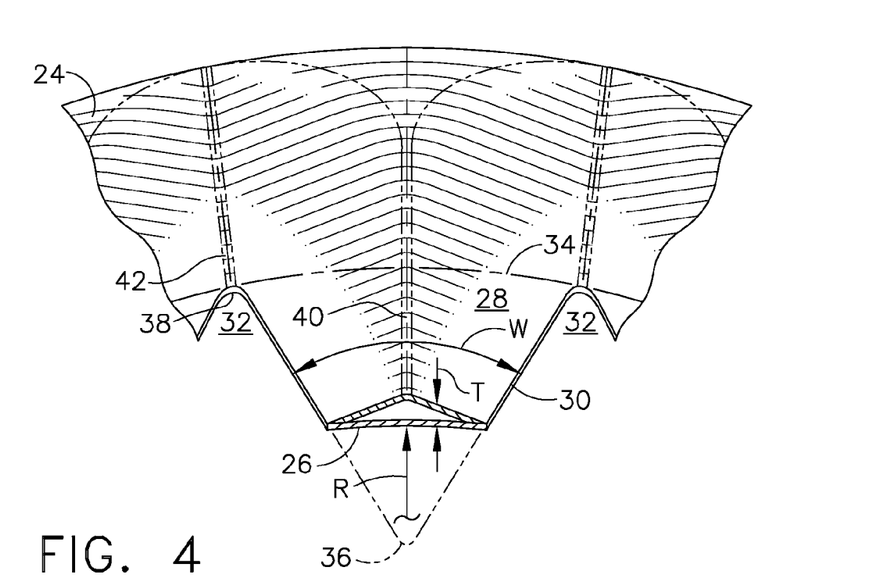
FIG. 4 is a radial sectional view through a portion of the exhaust nozzle illustrated in FIG. 2 and taken along line 4-4.

The two shells 24,26 may be formed of thin sheet metal and are spaced radially apart from each other, and are supported by internal ribs or gussets as required for aerodynamic flow control. Over their axially aft portions, the two shells converge radially together to a row of triangular chevrons 28 which define a circumferentially serpentine trailing edge 30 of the nozzle.

FIG. 1 shows the outer row of identical chevrons 28 in uniform repetition around the nozzle circumference, with the trailing edge 30 thereof varying in axial position along the axial length L of the chevrons to define the circumferentially serpentine configuration thereof.

As shown in FIGS. 1 and 4, the chevrons 28 are spaced circumferentially apart by respective axially diverging slots 32 which complement the converging chevrons in the uniform row thereof.

As shown in FIG. 4, each chevron 28 is triangular in the aft direction and converges in lateral or circumferential width W axially between its forward or upstream base 34 and its aft or downstream apex 36 along the serpentine trailing edge 30 on opposite lateral sides or edges of each chevron.

Correspondingly, each of the slots 32 is also triangular between two adjacent chevrons 28 and diverges axially aft in width from a root notch 38 in the same axial plane as the chevron bases 34. The slots diverge in the aft direction and terminate at the common aft plane of the chevron apexes 36.

Since the two shells 24,26 substantially increase the overall radial thickness T of the nozzle upstream from the chevron apexes 36, the chevrons are additionally radially serpentine circumferentially around the shells in addition to being circumferentially serpentine along the common trailing edge 30 thereof. Each chevron 28 therefore decreases in radial thickness T both axially and circumferentially to the thin trailing edge 30 which laterally bounds each chevron as illustrated in FIG. 4.

In particular, each chevron includes a central crown or ridge 40 extending upstream or forwardly from the apex 36 symmetrically or equidistantly between the two side edges 30 thereof. The central ridge 40 continues forwardly past the chevron base 34 along the two shells to the forward portion thereof.

The central ridges 40 corresponding with the chevrons 28 alternate with circumferentially adjacent corresponding valleys or flutes 42 extending axially forward from the slots 32 at their forwardmost notches 38. The ridges 40 extend axially forwardly from the corresponding chevron apexes 36, and the cooperating flutes 42 extend axially forwardly in parallel therewith from the corresponding slot notches 38 to effect the radially serpentine configuration circumferentially around the shells.

FIG. 2 illustrates the double wall configuration of the exhaust nozzle 18 and its increasing thickness forward from the aft trailing edge, and then its decreasing thickness over its forward portion as desired. When the chevrons 28 are introduced into the double wall nozzle, the base ends thereof at the slot notches 38 have a substantial radial thickness greater than the uniform thickness of the conventional single-ply subsonic chevron nozzle disclosed in the Background.

The introduction of the diverging slots 32 in a uniform thickness double shell would create a radially thick root notch which would act as an aerodynamic bluff body with associated drag loss therefrom.

In contrast, by introducing the serpentine ridges 40 and flutes 42 around the circumference of the double wall nozzle illustrated in the first embodiment in FIGS. 1-4, the two shells 24,26 may converge together in radial thickness both axially and circumferentially to the serpentine chevron trailing edge 30 around the corresponding diverging slots 32.

In this way, each chevron 28 has a thin trailing edge of minimum thickness along both side edges from the aft apex 36 to the root notches 38 and then blends aerodynamically both circumferentially to the central ridge 40 as well as axially aft along the flutes 42 between the ridges as the two shells increase in radial spacing in the aft direction.

The double wall chevron nozzle therefore includes the original circumferentially serpentine trailing edge 30 around the perimeter in addition to the radially serpentine configuration introduced by the elevated ridges 40 and intervening recessed flutes 42 which aerodynamically blend the flow surfaces of the nozzle along the perimeters of each chevron and intervening diverging slot.

A significant improvement in aerodynamic efficiency is thusly created by the duplex or double serpentine chevron nozzle to smoothly blend both external and internal flowstreams without the introduction of aft facing bluff bodies and associated aerodynamic loss therefrom.

FIG. 1 illustrates two embodiments of the exhaust nozzles 18,20 in a common aircraft engine application. The chevron nozzles replace conventional conical exhaust nozzles and may be used individually for either the outer nozzle or the inner nozzle, with the other nozzle remaining the conventional conical nozzle without chevrons if desired.

In the first embodiment illustrated in FIGS. 1-4, the inner shell 26 is circular in section with a constant radius R from the centerline axis at each axial section, and the outer shell 24 is radially serpentine and varies in radial position to include the axial ridges 40 and intervening axial flutes 42.

In particular, the inner shell 26 is cylindrical or conical as desired, and includes a smooth circular inner surface that defines an internal exhaust duct 44 which terminates in an annular outlet 46 at the chevrons 28.

Correspondingly, the outer shell 24 includes the external ridges 40 extending axially aft along the outer surface thereof.

And, the external flutes 42 extend axially aft between the external ridges 40 to the respective diverging slots 32 between the chevrons.

In FIG. 2, the inner shell 26 has a cylindrical configuration over its aft portion, with the outer shell 24 converging aft thereover. Accordingly, the external flutes 42 preferably begin at the forward end of the nozzle and then increase in radial depth axially aft along the ridges 40 to the slots 32.

In this way, the flutes 42 taper and blend at their forward ends into the uniform conical surface of the outer shell at its forward end, and also blend and taper to the diverging slots 32 at the aft ends thereof.

Figure 5:
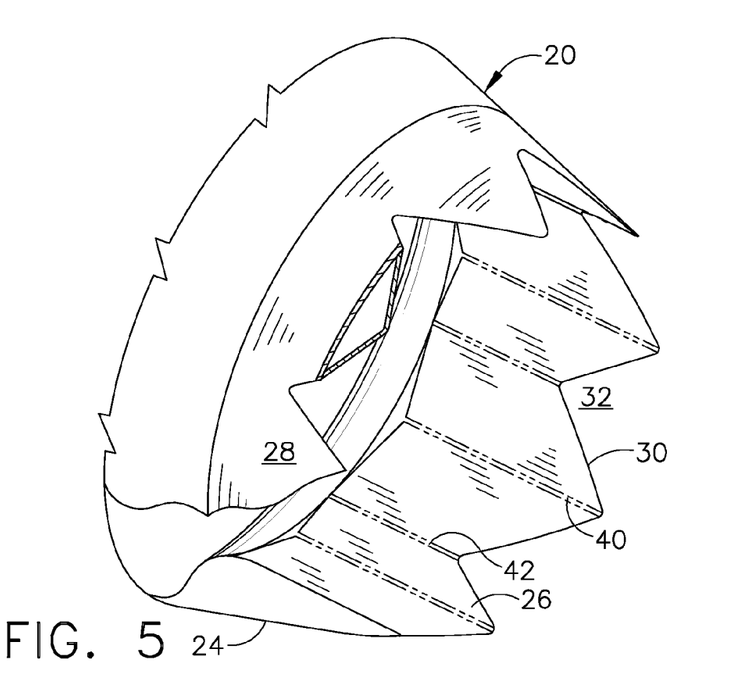
FIG. 5 is a isometric view of the inner exhaust nozzle illustrated in FIG. 1 in isolation.
Figure 6:
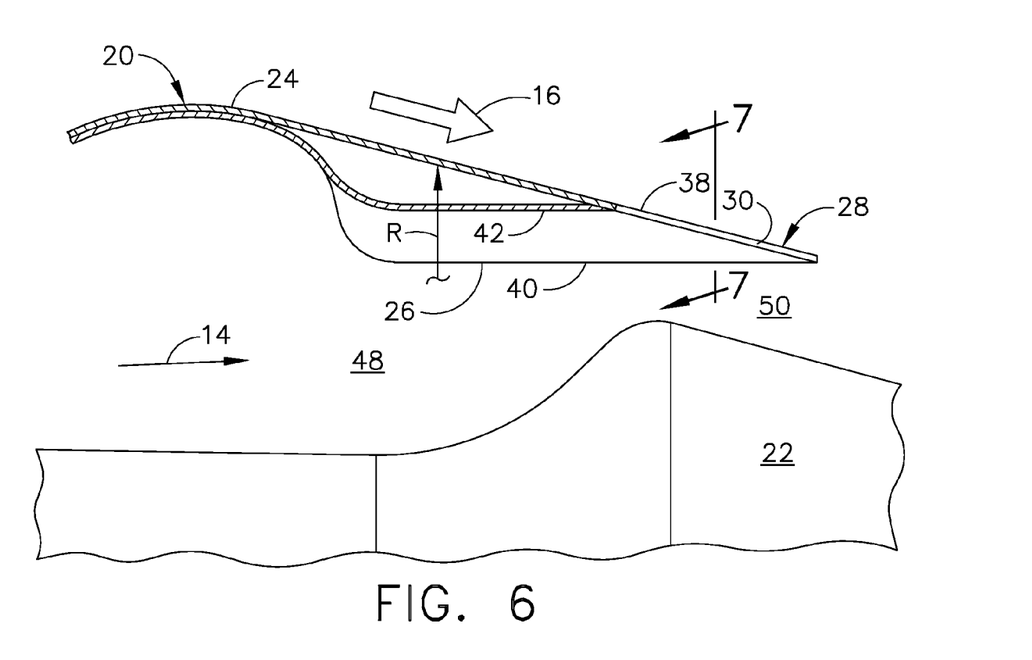
FIG. 6 is an axial sectional view of the inner nozzle illustrated in FIG. 1 and taken along line 6-6.
Figure 7:
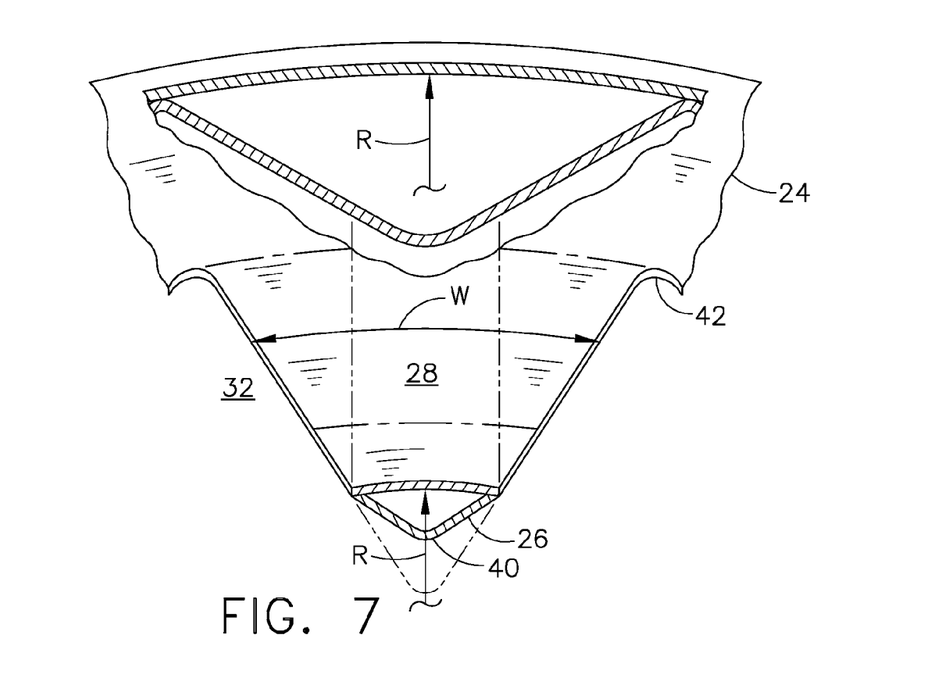
FIG. 7 is a radial sectional view of a portion of the exhaust nozzle illustrated in FIG. 6 and taken along line 7-7.

FIGS. 5-7 illustrate the inner nozzle 20 in a second embodiment in which like reference numerals identify like parts, but differently located. In particular, the outer shell 24 in this embodiment is smoothly conical and has circular cross sections, whereas the inner shell 26 is radially serpentine to cooperate with the circumferentially serpentine trailing edge 30 of the row of chevrons 28.

The outer shell 24 in this embodiment has a smooth circular outer surface over which the external flow may smoothly travel. The inner shell 26 in this embodiment varies circumferentially in radial position to include the internal ridges 40 extending axially aft along the inner surface thereof. The cooperating internal flutes 42 extend axially aft between the internal ridges 40 to the corresponding diverging slots 32 to define another exhaust duct 48 terminating in another outlet 50 at the chevrons 28.

The two exhaust nozzles 18,20 illustrated in FIGS. 1-7 are used in combination to define the outer exhaust duct 44 and outer nozzle outlet 46 surrounding the inner exhaust duct 48 and inner exhaust outlet 50.

In FIG. 2, the outer duct 44 carries the inverted core gases 16, with ambient airflow 14 being channeled outside the outer duct.

In FIG. 6, the inner duct 48 carries the inverted fan air 14, with the core flow 16 being discharged outside the inner nozzle 20.

In alternate embodiments, the externally serpentine nozzle 18 may be used alone, and the internally serpentine nozzle 20 may also be used alone where aerodynamic performance may be enhanced thereby.

In the FIG. 6 embodiment, the internal flutes 42 have substantially constant radial depth axially aft along the corresponding ridges 40 over most of the aft portion of the exhaust nozzle to the aft slots 32.

Since the outer and inner shells 24,26 converge radially together from a large thickness at the forward ends to a minimum thickness at the aft ends, the ridges 40 and flutes 42 may be introduced in either the outer or inner shells in various embodiments including the two embodiments illustrated in FIGS. 2 and 6 in contrast.

Further embodiments or permutations of the ridges and flutes in the double wall exhaust nozzle are also possible.

Figure 8:
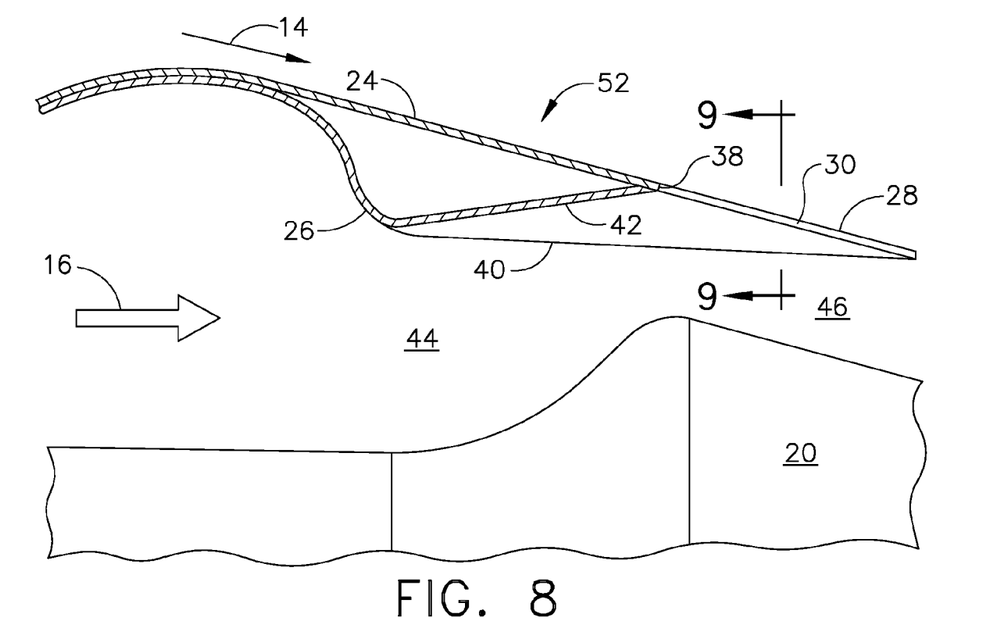
FIG. 8 is an axial sectional view, like FIG. 6, of the exhaust nozzle in accordance with another embodiment.
Figure 9:
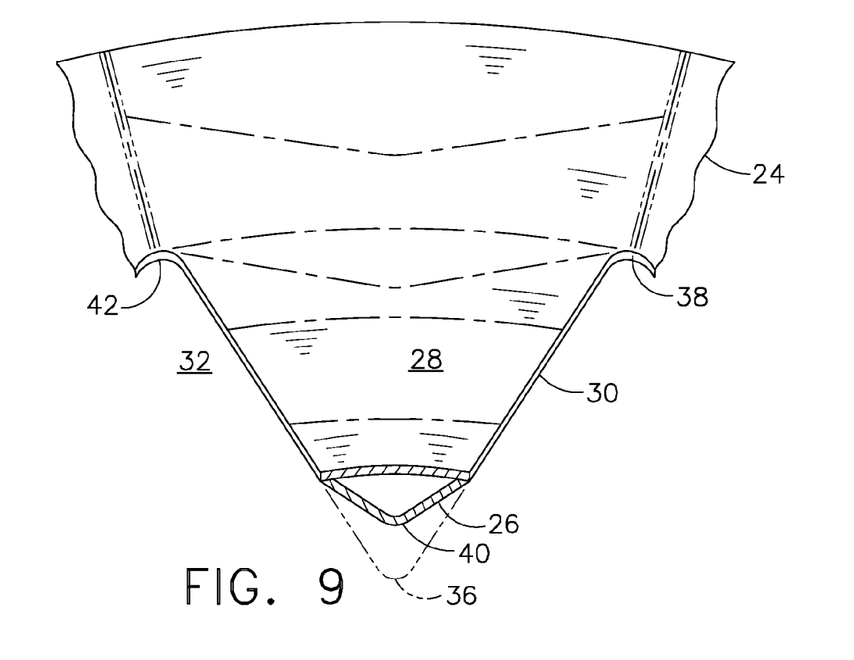
FIG. 9 is a radial sectional view through a portion of the exhaust nozzle illustrated in FIG. 8 and taken along line 9-9.

FIGS. 8 and 9 illustrate another embodiment of an exhaust nozzle, designated 52, which is generally similar to the internal serpentine nozzle 20 illustrated in FIGS. 5-7. Like reference numerals indicate like features.

The two nozzles 52 and 20 are generally similar to each other in configuration except that the internal flutes 42 in FIG. 8 increase in radial depth axially aft along the corresponding ridges 40 to the corresponding diverging slots 32. This permits, for example, different flow area control of the exhaust duct 44 in accordance with the specific requirements of the gas turbine engine.

The inner shell 26 illustrated in FIG. 8 has a generally cylindrical profile with the corresponding internal ridges 40 extending axially therealong. The internal flutes 42 commence at the relatively thick forward end of the nozzle and increase in depth and radius aft where they meet the diverging slots.

Figure 10:
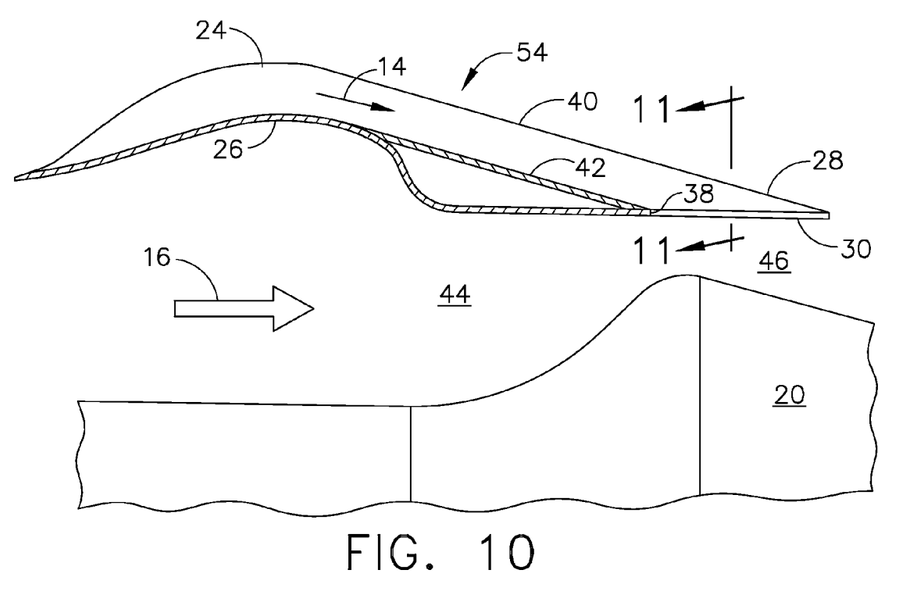
FIG. 10 is axial sectional view, like FIG. 2, of the exhaust nozzle in accordance with another embodiment.
Figure 11:
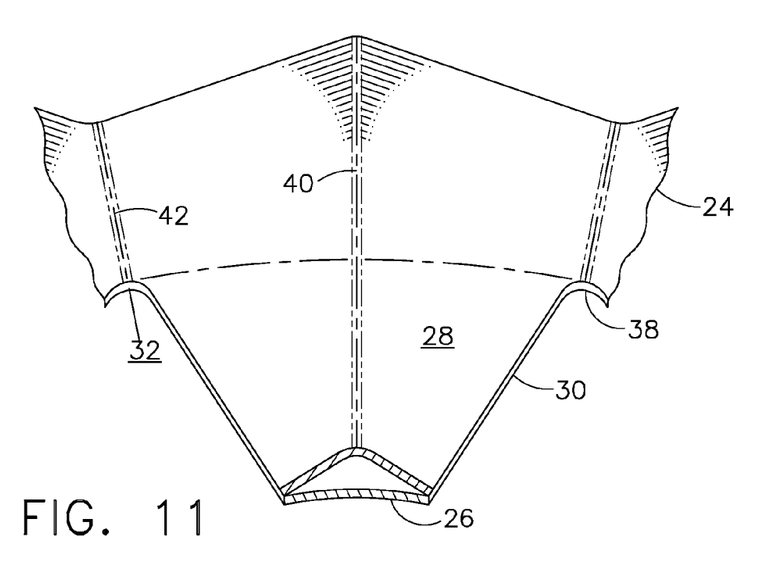
FIG. 11 is a radial sectional view through the exhaust nozzle illustrated in FIG. 10 and taken along line 11-11.

FIGS. 10 and 11 illustrate yet another embodiment of an exhaust nozzle designated 54, which is a variation of the external serpentine nozzle 18 illustrated in FIGS. 1-4. Like reference numerals indicate like features.

In this embodiment of the nozzle 54, the external flutes 42 have a substantially constant radial depth axially aft along the ridges 40 to the diverging slots 32 over most of the axial length of the nozzle. The ridges and flutes may commence well upstream of the converging portion of the nozzle and continue with uniform height and depth over the converging aft portion of the nozzle to the chevrons 28.

This configuration may be used to advantage to control aerodynamic performance of the external flow field outside the nozzle 54 as it blends and mixes with the internal flowstream discharged from the exhaust duct 44.

Presented above are two basic configurations of the fluted chevron exhaust nozzle in which either the inner shell or outer shell may be radially serpentine with the cooperating axial ridges and flutes, while the other shell remains cylindrical or conical in profile, with a smooth circumferentially circular perimeter.

And, the corresponding flutes in these two basic embodiments may have two further configurations including constant radial depth along most of their axial extent, or may smoothly vary or taper in radial depth as desired for providing a smooth aerodynamic transition and blending with the corresponding diverging slots between the locally thick chevrons.

In these four basic embodiments disclosed above for FIGS. 4, 7, 9, and 11, each of the chevrons 28 is substantially flat between the middle ridge 40 and the converging side edges 30 thereof between the base and apex. Since the chevrons decrease in thickness between their bases and apexes, the outer and inner surfaces thereof may be axially straight.

This is in contrast with the compound curvature or bowl configuration found in the original chevron nozzle disclosed in the Background. In that patent, the chevron nozzle was basically single-ply with uniform thickness chevrons being arcuate both circumferentially and axially.

In the double wall construction of the chevrons, the axially straight outer and inner surfaces thereof provide both substantial noise suppression and aerodynamic efficiency. If desired, the chevrons may be configured with axially arcuate inner or outer surfaces, or both, in the manner of the previous patent if additional benefits therefrom may be obtained.

In the two embodiments illustrated in FIGS. 4 and 11, the chevron ridge 40 is formed in the outer shell 24, and the inner shell 26 is circumferentially arcuate or concave inwardly and forms with the outer shell a radially outwardly projecting triangle in section. Each chevron is therefore triangular both axially and radially in external profile.

In the two embodiments illustrated in FIGS. 7 and 9, the chevron ridge 40 is formed in the inner shell 26, and the outer shell 24 is circumferentially arcuate or convex outwardly and forms with the inner shell a radially inwardly projecting triangle in section. Yet again, each chevron is both axially and radially triangular in profile.

The various forms of the chevron nozzles disclosed above may be used in various configurations of gas turbine aircraft engines where they can provide noise attenuation without undesirable aerodynamic performance penalty. The chevrons may be introduced in an otherwise conventional exhaust nozzle, such as the typical conical nozzle found in modern jet engines.

FIG. 2 illustrates in dashed line the conical profile of a typical reference nozzle 56. The reference nozzle has a circular outlet with a specific flow area.

By introducing the chevrons around the outlet end of the nozzle, the effective outlet area is changed by the circumferentially serpentine trailing edge of the nozzle which varies in axial position around the circumference thereof.

Accordingly, the chevron nozzle is suitably designed in geometry to match the required discharge flow area of the reference nozzle, which typically places the root notches 38 upstream in axial position from the aft end of the reference nozzle 56.

The flow area requirements of the various nozzles are dictated by the aerodynamic requirements of the specific exhaust duct through which exhaust flow is discharged. These flow area requirements depend on the thermodynamic and aerodynamic performance of the exhaust flow, such as the hot core gases or the cold fan air.

Nevertheless, the requisite flow area configuration of the nozzle for a given application may be readily introduced into the various forms of the chevron nozzle having the double wall configuration thereof.

As initially shown in FIG. 1, each nozzle 18,20 typically cooperates with an inner centerbody or cowl to define the exhaust duct and control the area distribution thereof. The outer nozzle 18 cooperates with the forward portion of the inner nozzle 20 to define the annular exhaust duct 44 therebetween as shown in FIG. 2.

The inner nozzle 20 cooperates with the forward portion of the internal plug 22 to define the flow area distribution for the exhaust duct 48 therebetween as shown in FIG. 6.

As shown in FIGS. 2, 6, 8, and 10 the various forms of the chevron nozzle may cooperate with the various forms of the inner cowls 20,22 to define the corresponding exhaust ducts 44,48 terminating respectively in corresponding nozzle outlets 46,50.

Whereas the typical subsonic exhaust nozzle for commercial aircraft engines converges to a throat of minimum flow area at the aft end thereof, the supersonic turbofan engine 10 illustrated in FIG. 1 will experience improved performance with a converging-diverging (CD) exhaust nozzle specifically configured for supersonic operation of the engine.

FIGS. 2, 6, 8, and 10 illustrate various configurations of the chevron nozzle and cooperating inner cowls which may be used in various engine designs to control exhaust duct flow area and effect CD nozzles in various configurations.

In the several embodiments, the exhaust ducts defined by the inner shell 26 converge aft in flow area to effect a throat, designated A8, of minimum flow area at the base of the chevrons 28. The inner surface of the inner shell 26 cooperates with the outer surface of the inner cowl which increases in diameter in the aft direction to effect the converging flow area.

From the throat A8 of minimal flow area, the exhaust duct 44 then diverges or increases aft in flow area along the chevrons for effecting a larger outlet flow area, commonly designated A9.

The introduction of the double wall exhaust nozzle disclosed above in various embodiments permits aerodynamic tailoring of both the inner shell, and internal exhaust duct, and the outer shell for their different cooperation with the different flowstreams channeled therealong.

The nozzle inner shell may be specifically tailored in configuration for effecting the desired converging-diverging area profile of the internal exhaust duct for maximizing aerodynamic performance of the engine, particularly at supersonic operation of the engine.

The nozzle outer shell may be differently tailored for maximum nozzle efficiency with the outer flowstream.

And, the fluted chevron nozzles permit aerodynamic blending of the internal and external flowstreams where they mix in the diverging slots between the chevrons for maximizing aerodynamic efficiency while additionally providing the desired acoustic attenuation of the exhaust noise.

The double wall construction of the chevron nozzle disclosed above therefore introduces additional design features which may be suitably varied for enhancing noise attenuation while maintaining good aerodynamic performance in various forms of aircraft turbofan gas turbine engines, now including supersonic in addition to subsonic engines.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A gas turbine engine exhaust nozzle comprising an annular shell terminating aft in a row of chevrons defining a serpentine trailing edge of the exhaust nozzle extending axially aft from corresponding root notches between adjacent chevrons to corresponding apexes thereof, and each chevron decreases in both radial thickness and circumferential width to said serpentine trailing edge including said notches, with said shell having corresponding flutes extending axially forward from said notches.

2. An exhaust nozzle according to claim 1 wherein:
said fluted shell is one of coaxial outer and inner shells converging aft to said chevrons spaced apart circumferentially by respective diverging slots along said trailing edge being circumferentially serpentine; and
each of said chevrons includes a central ridge extending axially forward and circumferentially between said corresponding flutes extending axially forward from said slots.

3. A nozzle according to claim 2 wherein said row of chevrons is both circumferentially and radially serpentine circumferentially around said shells, and each chevron converges in radial thickness from said ridge both circumferentially and axially to said serpentine trailing edge around said diverging slots.

4. A nozzle according to claim 3 wherein:
said inner shell includes a smooth circular inner surface defining an exhaust duct terminating in an outlet at said chevrons; and
said outer shell includes said ridges extending axially aft along the outer surface thereof, and said flutes extend axially aft between said ridges to said slots.

5. A nozzle according to claim 4 wherein said flutes increase in depth axially aft along said ridges to said slots.

6. A nozzle according to claim 4 wherein said flutes have a substantially constant depth axially aft along said ridges to said slots.

7. A nozzle according to claim 3 wherein:
said outer shell includes a smooth circular outer surface; and
said inner shell includes said ridges extending axially aft along the inner surface thereof, and said flutes extend axially aft between said ridges to said slots to define an exhaust duct terminating in an outlet at said chevrons.

8. A nozzle according to claim 7 wherein said flutes increase in depth axially aft along said ridges to said slots.

9. A nozzle according to claim 7 wherein said flutes have substantially constant depth axially aft along said ridges to said slots.

10. A nozzle according to claim 3 wherein each of said chevrons is substantially flat between said ridge and said trailing edge thereof in one of said shells, and the other shell is circumferentially arcuate to form therewith a radially projecting triangle.

11. A nozzle according to claim 3 further comprising an inner cowl spaced radially inwardly from said inner shell to define therewith an annular exhaust duct terminating in an outlet at said chevrons and converging aft in flow area to effect a throat of minimum flow area at said chevrons, and diverging aft in flow area from said throat.

12. An exhaust nozzle according to claim 1 wherein:
said fluted shell is one of coaxial outer and inner shells converging axially aft together to said chevrons along said trailing edge being axially serpentine; and
said chevrons being radially serpentine circumferentially around said shells.

13. A nozzle according to claim 12 wherein said chevrons are spaced circumferentially apart by respective diverging slots, and decrease in radial thickness both axially and circumferentially to said trailing edge.

14. A nozzle according to claim 13 wherein each of said chevrons is triangular and converges aft axially between a base and an apex along said serpentine trailing edge on opposite lateral sides thereof.

15. A nozzle according to claim 14 wherein each of said slots joins said shells at said flute extending forward between adjacent chevrons.

16. A nozzle according to claim 15 wherein:
each of said chevrons includes a ridge extending from said apex thereof and forward past said base thereof along opposite sides of a corresponding flute therebetween; and
said shells converge radially together both axially and circumferentially to said chevron trailing edge around said slots.

17. A nozzle according to claim 16 wherein said inner shell is circular and said outer shell is radially serpentine.

18. A nozzle according to claim 17 wherein:
said inner shell includes a smooth circular inner surface defining an exhaust duct terminating in an outlet at said chevrons; and
said outer shell includes said ridges extending axially aft along the outer surface thereof, and said flutes extend axially aft between said ridges to said slots.

19. A nozzle according to claim 18 wherein said flutes increase in depth axially aft along said ridges to said slots.

20. A nozzle according to claim 18 wherein said flutes have a substantially constant depth axially aft along said ridges to said slots.

21. A nozzle according to claim 16 wherein said outer shell is circular and said inner shell is radially serpentine.

22. A nozzle according to claim 21 wherein:
said outer shell includes a smooth circular outer surface; and
said inner shell includes said ridges extending axially aft along the inner surface thereof, and said flutes extend axially aft between said ridges to said slots to define an exhaust duct terminating in an outlet at said chevrons.

23. A nozzle according to claim 22 wherein said flutes increase in depth axially aft along said ridges to said slots.

24. A nozzle according to claim 22 wherein said flutes have substantially constant depth axially aft along said ridges to said slots.

25. A nozzle according to claim 16 wherein each of said chevrons is substantially flat between said ridge and said trailing edge thereof.

26. A nozzle according to claim 25 wherein said chevron ridge is formed in said outer shell, and said inner shell is circumferentially arcuate and forms with said outer shell a radially outwardly projecting triangle.

27. A nozzle according to claim 25 wherein said chevron ridge is formed in said inner shell, and said outer shell is circumferentially arcuate and forms with said inner shell a radially inwardly projecting triangle.

28. A nozzle according to claim 16 further comprising an inner cowl spaced radially inwardly from said inner shell to define therewith an annular exhaust duct terminating in an outlet at said chevrons and converging aft in flow area to effect a throat of minimum flow area in said exhaust duct at said chevrons, and diverging aft in flow area from said throat.

29. A nozzle according to claim 1 wherein said fluted shell is one of coaxial shells converging aft to said chevrons separated laterally by diverging slots having said flutes extending forwardly therefrom.

* * * * *